United States Patent [19]

Freed

[11] 3,895,365

[45] July 15, 1975

[54] SHAFT POSITION ENCODER APPARATUS

[75] Inventor: Gerald Lewis Freed, Highland Park, N.J.

[73] Assignee: Lockheed Electronics Company, Inc., Plainfield, N.J.

[22] Filed: June 14, 1974

[21] Appl. No.: 479,561

[52] U.S. Cl. .................. 340/198; 318/175; 331/16

[51] Int. Cl. ............................................ G08c 19/38

[58] Field of Search ..... 340/195, 198, 271, 347 SV; 323/101, 108, 119; 331/16

[56] References Cited

UNITED STATES PATENTS

| | | | |
|---|---|---|---|
| 3,160,803 | 12/1964 | White | 318/28 |
| 3,440,644 | 4/1969 | Burgis et al. | 340/347 |
| 3,478,357 | 11/1969 | Bacon | 343/10 |
| 3,805,182 | 4/1974 | Melcher | 331/16 |

OTHER PUBLICATIONS

Carlstein, Joseph, Shaft Angle to Digital Conversion, The Electronic and Engineer's Design Magazine, p. 94–100, Mar. 1965.

Monolithic Phase-Locked Loop, Exarintegrated Systems Inc., 1972, p. 1–8.

*Primary Examiner*—Thomas B. Habecker
*Assistant Examiner*—James Groody
*Attorney, Agent, or Firm*—Stephen B. Judlowe

[57] ABSTRACT

Electronic circuitry characterizes the instantaneous orientation of a rotating shaft by providing an azimuth reference pulse (ARP) once each cycle as the shaft rotates through a reference position, and an arbitrarily large number of substantially equally spaced azimuth change pulses (ACP) to fix the shaft position during each rotational cycle. The shaft position encoder circuitry includes apparatus for converting shaft position modulated synchro sinusoids to square waves of varying relative phase relationship, and a gated phase locked loop having an integrating sample and hold circuit controlled by Exclusive-OR logic.

6 Claims, 10 Drawing Figures

SHAFT POSITION ENCODER APPARATUS

DISCLOSURE OF THE INVENTION

This invention relates to electronic circuitry and, more specifically, to improved electronic circuitry for providing output signals characterizing the instantaneous orientation of a rotating shaft.

In many applications of current interest, signals embodying information representing the instantaneous angular position of a rotating shaft (so called shaft position encoders or the like) are required.

To illustrate by one of many applications, in an air traffic monitoring and control system, the position of an antenna-bearing rotating shaft during each primary and secondary surveillance radar interrogation and return cycle is required to "position" detected aircraft on a particular azimuth relative to the antenna.

It is an object of the present invention to provide improved shaft position encoding apparatus.

More specifically, it is an object of the present invention to provide shaft orientation characterizing circuitry which may readily be fabricated and which provides a regular and arbitrarily larger stream of shaft-cycle-subdividing azimuth change pulses, even for a slowly rotating shaft, by anticipating continuous shaft rotation.

The above and other objects of the present invention are realized in a specific, illustrative shaft position characterizing circuit arrangement, wherein the sinusoidal waves provided by a high speed synchro coupled to a monitored shaft are squared to present two square wave trains alternating once between in-phase and 180° out-of-phase conditions during each synchro cycle. Exclusive-OR logic and a low pass filter operate on these waves to produce a single pulse for each such synchro cycle.

A phase locked loop with a frequency multiplying divider in its feedback path operates on the output of the low pass filter to produce the desired sequence of pulses which characterize the progressive rotation of the monitored shaft through its travel. An integrating sample and hold circuit is included in the forward path of the phase locked loop to provide regularly spaced shaft-change pulses, the circuit element being periodically updated in an integrating, sampling mode as necessary to track the actual shaft advancement.

Figure 1:
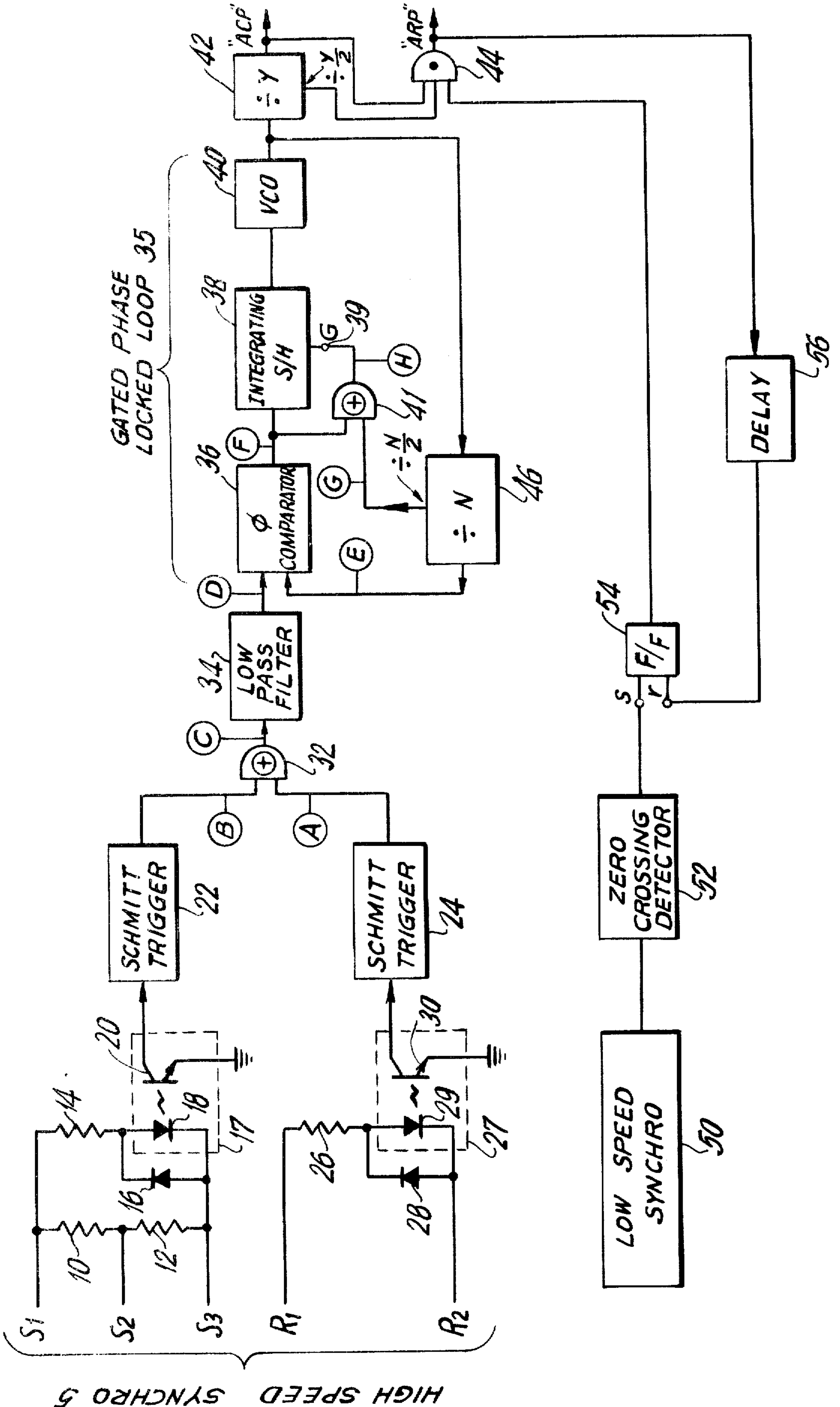

The above and other objects and features of the present invention will become more clear from the following detailed description of a specific illustrative embodiment thereof, presented in conjunction with the accompanying drawing, in which:

FIG. 1 schematically depicts illustrative shaft position indicating apparatus embodying the principles of the present invention.

FIGS. 2A–2D and 3A–3E illustrates signal waveforms which characterize the operations of the FIG. 1 arrangement.

Referring now to the drawing, there is shown a circuit arrangement for receiving the sinusoidal inputs from two synchros, e.g. a high speed synchro 5 and a low speed synchro 50, the synchros being mechanically coupled to each other and to the subject shaft whose position is being monitored. As is well known, each of the synchros e.g., the high speed synchro 5 specifically illustrated in the drawing, comprises S1, S2 and S3 leads and two reference leads R1 and R2 to provide information which characterizes the instantaneous position of the shaft to which the synchro is coupled. Thus, the S1-to-S3 potential may comprise a sinusoid amplitude modulated with the sine of the instantaneous angular position of the synchro members; the S1–S2 voltage bears an amplitude modulation given by the sine of the angle plus 120°; and the S2–S3 potential is given by the sine of the angle plus 240°. It will be assumed here that the S1–S3 potential is employed.

The overall functional purpose of the FIG. 1 circuit arrangement is to provide output pulses which cumulatively indicate the instantaneous position of the monitored shaft. Thus, once each revolution when the shaft rotates through a reference position, an azimuth reference pulse (ARP) is generated. Thereafter, in the cyclic interval between ARP pulses as the shaft rotates through its assumed 360° travel, a fixed (and arbitrarilly larger) number of azimuth change pulses are generated. Thus, the instantaneous position of the shaft may be determined in any manner well known to those skilled in the art. For example, the ARP pulses can be employed to clear a counter, and the counter then advanced by the ACP pulses. The counter output will thus provide a digital measure of the shaft angular orientation. This may be converted to analog form if an analog measure of the shaft position is desired by a digital-to-analog converter. Alternatively, the azimuth change pulses may simply be integrated to obtain an instantaneous analog measure of shaft position. Further, as a matter of overview, the high speed synchro 5 is employed to develop the relatively rapidly occurring azimuth change pulses, while the low speed synchro 5 is employed to develop the azimuth reference pulses.

Figure 2A:
Figure 2B:
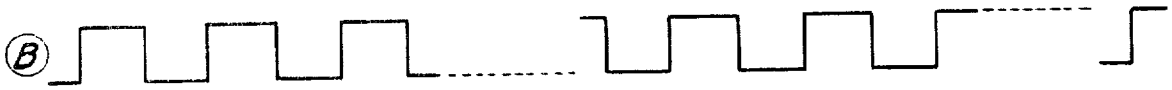

Examining first the manner in which the azimuth change pulses are developed, the reference sinusoid between leads R1 and R2 is coupled by a resistor 26 to photodiode 29 included in an optical coupler 27. Thus, for each positive (R1 relative to R2) excursion of the reference wave, the photodiode 29 emits light which turns on a normally non-conductive phototransistor 30. The collector of the phototransistor 30 thus is characterized by a relatively low potential during the major portion of the positive reference wave half cycles and this is further processed to squared form by a threshold trigger circuit 24, e.g., a Schmitt trigger. This wave, depicted in FIG. 2A, is then impressed on the lower input to an Exclusive OR gate 32. A diode 16 is employed to protect the diode 18 from reverse potential, and to effectively present the synchro leads S1–S3 with a constant impedance load.

The S1–S3 potential (the sinusoid of the reference wave amplitude modulated with the sine of the synchro sensor) obtaining between the synchro leads S1 and S3 is similarly coupled by a resistor 14 to a photodiode 18 included in an optical coupler 17. The photodiode 18 emits light which turns on a phototransistor 20 during the positive excursions of the composite S1–S3 signal which, it may be recalled, corresponds to a double side band, suppressed carrier wave of the form $$V_{S1-S3} = V_o \sin\theta \sin wt,$$

where $\theta$ represents the instantaneous synchro position and $w$ is the synchro exciting frequency, e.g., 60 Hz. As is well known for double side band suppressed carrier waves, the phase of the relatively high frequency sinusoidal signal reverses phase with each change in polarity of the modulating (envelope) signal, i.e., with a reverse in polarity of the sin $\theta$ modulation. Thus, when sin $\theta$ is positive, the transistor 20 is turned on in phase with the transistor 30 and, when sin $\theta$ is negative, the transistor 20 is turned on 180° out of phase with the transistor 30 (or vice-versa; absolute polarities or phases are obviously irrelevant). The above described wave present at the collector of the transistor 20 is regenerated and squared, and is presented to the upper input of the Exclusive OR gate 32 by a Schmitt trigger 22, (see FIG. 2B).

When the amplitude of sine $\theta$ is very small near its zero crossings (and thereby also the peak value of the composite S1–S3 potential), the diode 18 is not fully energized and emits light in an erratic manner typically insufficient to saturate the transistor 20. About the zero crossing positions then, the voltage output of the transistor 20 and of the Schmitt trigger 22 is indeterminate.

During those periods when the two inputs to the Exclusive OR gate 32 are in phase, there is substantially no output from the gate 32 other than voltage transient spikes which result because of a lack of perfect time coincidence between the leading and trailing edges of the square waves supplied by the Schmitt triggers 22 and 24. Thus, for such phase coincidence intervals, the output of the Exclusive OR gate 32 is low with the exception of some small positive transients, (see FIG. 2C).

Conversely, when the inputs to the Exclusive OR gate 32 are 180° out of phase, the output of the Exclusive OR gate 32 remains high, again with the possible exception of some very short negative transients occurring by reason of any lack of precise mutually exclusive spacing between the pulses supplied by the Schmitt triggers 22 and 24. When the sine $\theta$ signal is very small about its zero crossings and the output of the Schmitt trigger 22 is indeterminate, we have found that the output of the Exclusive OR gate 32 comprises a signal with about a 50% duty cycle.

Figure 2C:
Figure 2D:

The composite FIG. 2C wave above described for the alternating periods when sine $\theta$ is both positive and negative, spaced by a period of intermediate duty cycle, is then passed through a low pass filter 34. The filter 34 eliminates all voltage transients and like relatively high frequency wave components, hence generating a single square wave pulse for each complete cycle of the high speed synchro 5, i.e., for each 360° electrical degree excursion for the sine $\theta$ modulation on the synchro leads S1–S3, (see FIG. 2D and with a compressed time base, FIG. 3A).

The pulse at the output of the low pass filter 34 is supplied as one input to a phase comparator 36 of a composite gated phase locked loop 35. As is conventional, the phase locked loop comprises a voltage controlled oscillator 40 (or, other controlled oscillator such as a current controlled oscillator) which supplies its output via a divide-by-N divider 46 to a second input of the phase comparator 36. The phase locked loop functionally performs one of its classic functions to multiply the pulse frequency supplied by the low pass filter 34 by the factor N at the output of the oscillatior 40. The output pulses supplied by the voltage controlled oscillator 40 are then divided by a factor Y in a divider 42 to comprise the azimuth change pulses, where the high speed synchro factor multiplied by N and divided by Y comprises the desired ACP pulse rate, i.e., subdivides a complete rotational cycle of the shaft being monitored into the desired number of parts.

The phase locked loop 35 automatically adjusts the output frequency of the voltage controlled oscillator 40 such that the two inputs to the phase comparator 36 are 90° apart. One extensively used phase comparator is simply an Exclusive OR logic gate. In accordance with one aspect of the present invention an integrating sample and hold circuit 38 is disposed intermediate the phase comparator 36 and the voltage controlled oscillator 40. The integrating sample and hold circuit 38 is controlled by a gate terminal 39 which, in turn, is driven by the output of the Exclusive OR gate 41. When the gate 41 is fully enabled, the circuitry 38 operates in an integrating input-sampling mode; when the logic condition for the Exclusive OR gate 41 is not satisfied, the network 38 operates in a hold mode supplying a fixed output voltage to control the oscillator 40.

Figure 3A:
Figure 3B:
Figure 3C:
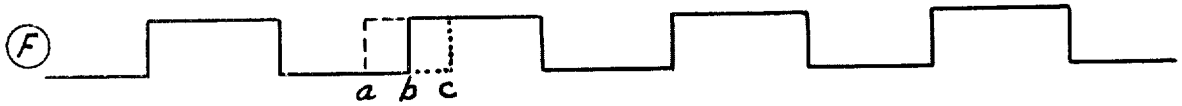
Figure 3D:
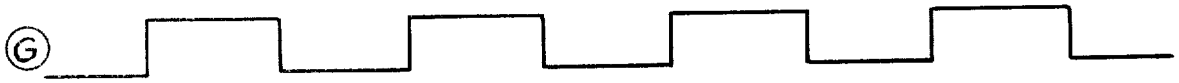
Figure 3E:
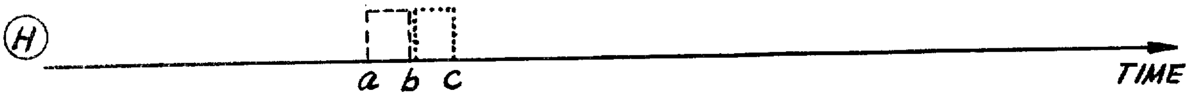

The operation of the composite gated phase locked loop 35, including the integrating sample and hold circuit 38, may be more readily understood with respect to the wave forms of FIGS. 3A–3E. FIG. 3A depicts the input pulses supplied to the phase lock loop by the low pass filter 34, this being the same wave form shown in FIG. 2D and discussed above, but presented in FIG. 3A with a concentrated reduced time base. The wave form of FIG. 3B comprises the second input to the phase comparator supplied at the output of the divider circuit 46, which during phase lock comprises a square wave identical in frequency to that in FIG. 3A, but displaced therefrom by 90 electrical degrees. FIG. 3C depicts the wave form at the output of the phase comparator 36 which comprises the modulo-2 (Exclusive OR) logic sum of the wave forms of FIGS. 3A and 3B, while FIG. 3D depicts the square wave present at the next-to-last stage of the divider 46 which, of course, comprises a double frequency square wave vis-a-vis that of FIG. 3B. The output of the integrating sample/hold circuit 38 controlling gate 41 is illustrated in FIG. 3E.

The wave forms depicted in solid line in FIGS. 3A–3E obtain for the condition of precise phase lock, i.e., where the 90° offset relationship precisely obtains between the wave forms of FIGS. 3A and 3B which are of precisely the same frequency, and thus where the stored potential in the circuit element 38 is that required to drive the VCO 40 to the correct output frequency. For this condition, it will be observed that the wave of FIG. 3E present at the output of the Exclusive OR gate 41 is and remains at zero because of the exact correspondence between the waves of FIGS. 3C and 3D. Thus, the integrating sample and hold circuit 38 is never switched to its integrating, sampling mode since it already stores a voltage precisely that required for the voltage controlled oscillator 40 to generate the required output (N times the frequency of the input wave of FIG. 3A properly phased).

When the relationship for the composite gating phase lock loop 35 departs from the exact lock conditions illustrated in solid lines in FIGS. 3A–3E, the integrating sample and hold circuit 38 is periodically gated to its integrating, sampling mode such that its stored VCO controlling voltage is varied in a direction to change the phase locked loop output square wave frequency in a direction to again attain an exact lock condition. Thus, by way of brief example, assume that the input frequency supplied by the low pass filter 34 increases, resulting in shorter, more frequently recurring pulses. This is in part illustrated by the dashed modification to the input square wave pulses shown for the interval *a–b* in FIGS. 3A–3E. When this condition obtains, i.e., during the period *a–b* in FIG. 3, a pulse is generated at the output of the Exclusive OR gate 41 (FIG. 3E) to switch the element 38 to its integrating, sampling mode, the circuitry 38 thus operating on the relatively high potential existing at the output of the comparator 36 (FIG. 3C). In particular, the integrator 38 operates upon this high potential by suitably varying the VCO controlling potential in a direction to increase the loop 35 output frequency to track the increasing input frequency. The specific changes (magnitude and polarity) to effect this is, of course, dependant upon the transfer characteristics of particular implementations for the circuit elements utilized.

Similarly, the dotted modification to the input pulse of FIG. 3A for the interval *b–c* corresponds to the situation where the input pulses become longer when the input frequency decreases. When this situation obtains, the sample and hold circuitry 38 is gated on by a pulse output of the Exclusive OR gate 41 during the interval *b–c* (the dotted curve of FIG. 3E) to turn the integrator 38 on during the time *b–c* when the input thereto (FIG. 3C) is low. Thus, the sampling integrator 38 modifies the voltage controlled oscillator controlling potential in an opposite direction vis-a-vis the situation above discussed, to reduce the output frequency of the composite gated phase lock loop 35.

Thus, the above discussion has shown that the phase locked loop 35 and, more particularly, the integrating, periodically up-dated sample and hold circuit 38 which controls the oscillator 40, provides a constant stream of regularly recurring output pulses in the interval between those times when the circuitry 38 is up-dated, if in fact any correction is required. Thus, the composite loop 35 anticipates the assumed continuous, constant speed rotation of the shaft being monitored. This also provides the capability of quantizing each complete cycle of rotation of the monitored shaft into as many subportions as required as by simply varying the loop division factor N, (and the frequency-voltage transfer characteristic of the voltage controlled oscillator 40). As a general matter, and assuming a factor Z between the high speed and low speed synchros 5 and 50, i.e., that the low speed synchro 50 rotates once for each rotation of the monitored shaft while the high speed synchro 5 rotates through Z revolutions for each cycle of the shaft, each rotation of the subject shaft will give rise to $Z \times N \div Y$ azimuth change pulses each complete revolution, assuming a divider 42 of modulus Y is connected to the output of the phase locked loop 35.

To obtain an azimuth reference pulse (ARP) as the subject shaft rotates through a reference orientation, the shaft position indicating modulation from the low speed synchro is detected and a zero crossing detector employed to provide a signal when the shaft passes through the reference position. More simply stated conceptually, the modulation on the S1–S3 low speed synchro leads may simply be detected at a zero crossing detector 52 employed to detect one of the $\theta = 0$ transitions.

The output of the zero crossing detector 52 may be used as such to directly comprise an effective ARP signal. However, for some purposes, e.g., for the ACP-ARP format employed for air traffic control, it is required that the ARP pulse occur intermediate two consecutive ACP pulses. To this end the output of the zero crossing detector 52 sets a flip-flop 54 which, in turn, partially enables a coincidence gate 44. Also supplied to the AND gate 44 are the ACP pulses and the output of the next-to-last stage in the divider 42. Some reflection will show that the required correspondence between the two outputs of the divider 42 supplied to the AND gate 44 will generate an effective strobe interval midway between the ACP pulses. When such a strobe time occurs when the flip-flop 54 has been set, the single ARP output pulse is produced. The ARP pulse is then also delayed by delay circuit 56, e.g., monostable multivibrator circuitry, and employed to reset the flip-flop 54 until the next ARP pulse is encountered.

The above described arrangement has thus been shown by the above to produce the desired ARP–ACP shaft position encoding signals. The circuitry is operative in an effective look ahead or anticipatory mode desired for relatively slowly rotating shafts characterized by a substantially constant speed of rotation to provide an arbitrarily large number of regularly spaced ACP pulses to quantize a cycle of rotation for the monitored shaft into a correspondingly large number of subdivisions.

The above arrangement is merely descriptive of the principles of the present invention. Numerous modifications and adaptations thereof will be readily apparent to those skilled in the art without departing from the spirit and scope of the present invention.

What is claimed is:

1. In combination in shaft position characterizing apparatus, means for supplying a pulse wave representative of a measure of the rotational position of the shaft being monitored, and a gated phase locked loop, said gated phase locked loop comprising a forward gain path comprising a cascaded phase comparator, integrating sample and hold circuit means, and a controlled oscillator regulated by the output of said integrating sample and hold means, and a feedback frequency divider connected between the output of said controlled oscillator and a first input to said phase comparator, said pulse wave supplying means being connected to a second input of said phase comparator, said feedback frequency divider comprising more than one stage, and modulo-2 logic means having inputs connected to the output of said phase comparator and to the output of the next-to-last one of said feedback divider stages for controlling the mode of operation of said integrating sample and hold circuit.

2. A combination as in claim 1 further comprising additional divider means connected to the output of said controlled oscillator.

3. A combination as in claim 1 wherein said pulse supplying means comprises a synchro mechanically coupled to the shaft being monitored, said synchro comprising means for supplying a reference wave and a further wave including information representative of the instantaneous angular position of the shaft being monitored, means connected to said synchro for providing square wave replicas of said synchro supplied waves, modulo-2 logic means receiving said square waves, and a low pass filter connected to the output of said modulo-2 logic means.

4. A combination as in claim 2 further comprising a low speed synchro, zero crossing detector means for providing an output pulse when the shaft orientation information supplied thereto by said low speed synchro signals that said shaft is passing through a reference position, a flip-flop selectively set by said zero crossing detector means, and coincidence logic means connected to an output of said flip-flop and to said additional divider means for providing an azimuth reference pulse.

5. A combination as in claim 4 further comprising delay means connected to the output of said coincidence means for selectively resetting said flip-flop.

6. A combination as in claim 2, wherein said pulse supplying means comprising a synchro mechanically coupled to the shaft being monitored, said synchro comprising means for supplying a reference wave and a further wave including information representative of the instantaneous angular position of the shaft being monitored, means connected to said synchro for providing square wave replicas of said synchro supplied waves, Exclusive OR logic means receiving said square waves, a low pass filter connected to the output of said Exclusive OR logic means, a low speed synchro coupled to said synchro, zero crossing detector means for providing an output pulse when the shaft orientation information supplied thereto by said low speed synchro signals that said shaft is passing through a reference position, a flip-flop selectively set by said zero crossing dector means, coincidence logic means connected to an output of said flip-flop and to said additional divider means for providing an azimuth reference pulse, and delay means connected to the output of said coincidence means for selectively resetting said flip-flop.

* * * * *